United States Patent [19]

Nielinger et al.

[11] Patent Number: 4,788,259

[45] Date of Patent: Nov. 29, 1988

[54] FLAME-PROOF POLYAMIDES

[75] Inventors: Werner Nielinger; Hermann Kauth, both of Krefeld; Heinz-Josef Füllman, Leichlinger, all of Fed. Rep. of Germany

[73] Assignee: Bayer Aktiengesellschaft, Leverkusen, Fed. Rep. of Germany

[21] Appl. No.: 37,033

[22] Filed: Apr. 10, 1987

[30] Foreign Application Priority Data

Apr. 22, 1986 [DE] Fed. Rep. of Germany ....... 3613490
Apr. 22, 1986 [DE] Fed. Rep. of Germany ....... 3613491

[51] Int. Cl.⁴ .............................................. C08L 77/00
[52] U.S. Cl. .................................... 525/420; 524/123; 524/125
[58] Field of Search ................. 525/420; 524/123, 125

[56] References Cited

U.S. PATENT DOCUMENTS

| | | | |
|---|---|---|---|
| 3,544,509 | 10/1968 | Carroll et al. | 524/129 |
| 3,576,793 | 10/1968 | Carroll et al. | 526/278 |
| 4,078,016 | 3/1978 | Kramer | 525/389 |
| 4,374,971 | 2/1983 | Schmidt et al. | 558/117 |
| 4,524,167 | 8/1985 | Spivack et al. | 524/121 |

FOREIGN PATENT DOCUMENTS 0077493 4/1983 European Pat. Off. .

OTHER PUBLICATIONS

*Chemical Abstracts,* vol. 104 (2):6538u, p. 26.
Patent Abstract of Japan, Book 7, No. 39 (c-151)[1184], Feb. 17, 1983; & JP-A-57 192 460 (Teijin) 26.11.1982.
Patent Abstracts of Japan, Book 1, No. 120 (C-77), Oct. 12, 1977, Section 2849 C77; & JP-A-52 82955 (Toyo Boseki) 07.11.1977.

*Primary Examiner*—John C. Bleutge
*Assistant Examiner*—A. Carrillo
*Attorney, Agent, or Firm*—Connolly and Hutz

[57] ABSTRACT

The invention relates to flame-proof polyamide materials which can be processed by a thermoplastic method and consist of blends of amorphous, partly aromatic polyamides and 3–40% by weight of polyphosphonates.

6 Claims, No Drawings

FLAME-PROOF POLYAMIDES

The invention relates to flame-proof polyamide materials which can be processed by a thermoplastic method and consist of blends of amorphous, partly aromatic polyamides and 3-40% by weight of polyphosphonates.

By virtue of their good mechanical and electrical properties and because of their good resistance to chemicals, polyamides have found many uses as a material in the industrial field. They are used for the production of components for the construction of machines and automobiles and for the production of housings, coverings and switch cabinets. In this field, fire-retardant products are becoming increasingly important, particularly for the electrical sector. It is precisely for these applications that the use of polyamides in a fire-retardant formulation and having good electrical properties, such as high tracking resistance, is desirable. These requirements are not always fulfilled by adding the known flame-retardants. Often, cloudy and opaque products are also obtained when a flame-retardant finish is imparted to transparent polyamides.

Thus, no satisfactory method has been found to date for the preparation of readily processable blends having adequate toughness from the industrially important aliphatic polyamides and polyphosphonates. Because of the considerable increase in the melt viscosity, blends having a high polyamide content cannot be compounded without problems and subsequently processed by injection moulding, while the toughness of blends having a high polyphosphonate content decreases dramatically.

Surprisingly, it has now been found that amorphous, partly aromatic flame-proof polyamide blends which can readily be processed by a thermoplastic method and give polyamide materials having high tracking resistance are obtained if the polyamides are treated with polyphosphonates. Transparent polyamides retain their transparency when this flame-proof finish is imparted and do not show the crosslinking effect which is found when polyphosphonates are added to aliphatic polyamides.

The invention therefore relates to thermoplastic, flame-proof moulding materials consisting of amorphous, partly aromatic polyamides containing 3 to 40, preferably 3 to 20, in particular 8 to 15%, by weight of polyphosphonates in the polyamide/polyphosphonate blend and 97 to 60, preferably 97 to 80, and in particular 92 to 85%, by weight of the polyamides mentioned, and, where appropriate, further customary additives for the moulding materials.

Suitable polyamides are preferably those which are composed to the extent of at least 30 mol % of aromatic, polyamide-forming components, particularly preferably of 50 mol % of aromatic dicarboxylic acids.

Examples of amorphous, partly aromatic polyamides are preferably those formed from aromatic dicarboxylic acids, such as isophthalic acid or terephthalic acid, it being possible to use concomitantly, if appropriate, aliphatic or cycloaliphatic dicarboxylic acids, such as adipic acid, sebacic acid, azelaic acid, decanedicarboxylic acid or cyclohexanedicarboxylic acid, and from diamines. The selection of the diamines is not subject to any limitation; any diamines suitable for the preparation of polyamides which can be shaped in a thermoplastic manner can be used. Examples are tetramethylenediamine, hexamethylenediamine, the mixture of isomers composed of 2,2,4-trimethylhexamethylenediamine and 2,4,4-trimethylhexamethylenediamine, bis-(4-aminocyclohexyl)-methane, bis-(4-aminocyclohexyl)-propane, 4,4'-diamino-3,3'-dimethyldicyclohexylmethane, 3-amino-methyl-3,5,5-trimethylcyclohexylamine, m-xylenediamine and p-xylylenediamine. Finally, it is also possible to employ concomitantly, as comonomers, aminocarboxylic acids or their lactams, for example ε-aminocaproic acid, ω-aminoundecanoic acid and ω-aminolauric acid.

Preferred amorphous, partly aromatic polyamides are those formed from isophthalic acid and hexamethylenediamine or from terephthalic acid and the mixture of isomers consisting of 2,2,4-trimethylhexamethylenediamine and 2,4,4-trimethylhexamethylenediamine or from isophthalic acid, terephthalic acid, decanedicarboxylic acid, hexamethylenediamine and bis-(4-aminocyclohexyl)methane or from adipic acid, isophthalic acid, hexamethylenediamine and 4,4'-diamino-3,3'-dimethyldicyclohexylmethane or from adipic acid, hexamethylenediamine and bis-(4-aminocyclohexyl)-methane or from laurolactam, isophthalic acid and 4,4'-diamino-3,3'-dimethyldicyclohexylmethane.

Polyamides which are particularly preferred are amorphous polyamides formed from isophthalic acid and hexamethylenediamine.

Suitable polyphosphonates and the preparation thereof are described in German Offenlegungsschrift (German Published Specification) No. 2,944,093. They consist of recurring units having the structure

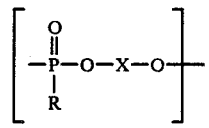

wherein
R represents an alkyl radical having 1-6, preferably 1-3, C atoms or an optionally substituted cycloalkyl radical having 5-30, preferably 6-12, C atoms, an alkyl radical having 7-30, preferably 7-16, C atoms or an aryl radical having 6-30, preferably 6-18, C atoms.

X denotes at least one of the radicals phenylene or denotes a radical

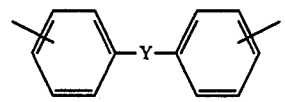

in which
Y is a bond or a $C_1$-$C_5$-alkylene, preferably $C_1$-$C_3$-alkylene, radical, a $C_5$-$C_{12}$-cycloalkylene, preferably $C_6$-$C_{10}$-cycloalkylene radical, or an S, O, $SO_2$, CO or $C(CH_3)_2$ bridge member.

The aromatic rings of X can also be substituted independently of one another by alkyl groups (A) having 1-4 C atoms (up to 4 alkyl groups in each aromatic ring).

Polyphosphonates which are particularly preferred are the phosphonic acid ethers of 4,4'-dihydroxybiphenyl and/or hydroquinone with methane phosphonic acid and/or ethanephosphonic acid.

The polyphosphonates preferably have average molecular weights (number average $\overline{M}_n$ determined by osmometry in methylene chloride) of 2,000 to 80,000, in particular 4,000 to 40,000.

Compounding of the blends is carried out on commercially available single-screw and multi-screw extruders of conventional design. In this process, the premixed polymers can be fed directly to the extruder. It is also possible, however, to meter the polyphosphonate into polyamide which is already melted. This procedure is advisable when a sensitive polyphosphonate is used.

For compounding it is also possible, where appropriate, to mix so-called masterbatches, i.e. melt mixtures containing high proportions of polyphosphonates (e.g. 50 to 90% by weight) and low proportions (e.g. 50 to 10% by weight) of amorphous, partly aromatic polyamides, with the amorphous, partly aromatic polyamides to give polyamides according to the invention in order to obtain the claimed moulding materials which preferably contain 3 to 20% by weight of polyphosphonates.

Compounding should be carried out at temperatures of 260° to 285° C., preferably 270° to 285° C.

The flame-proof polyamide moulding materials, according to the invention, which can be processed by a thermoplastic method may contain the customary additives and auxiliaries in amounts customary in the prior art, for example one or more fillers, in particular glass fibres in amounts of 10 to 60% by weight, relative to the total mixture. Other suitable fillers and reinforcing materials are glass microspheres, chalk, quartzes, such as asbestos, felspar, mica, talc, wollastonite and kaolin in a calcined and non-calcined form. Mention should also be made of dyestuffs and pigments, in particular colour blacks and/or nigrosine bases, stabilizers and processing auxiliaries, and also prior-art impact-modifiers, for example those based on copolymers of ethylene, poly(-meth)acrylates and grafted polybutadienes and many others, as described in the literature and in patents. Depending on the intended use it is also possible concomitantly to use further flame-retardants, e.g. halogen compounds of the known type, where appropriate with the addition of synergistic additives such as zinc oxide, zinc borates, antimony oxide, metal salts and/or melamine and melamine derivatives of the known types.

The moulding materials according to the invention are distinguished by being flame-retardant, by good homogeneity and good mechanical and electrical properties. In addition, the transparency of the polyamides is not affected by the flame-proof treatment according to the invention. They are suitable for the production of injection mouldings for industrial applications, for example for housing components, coverings, transparent parts for measuring devices or for filaments.

EXAMPLES

Example 1

10 parts by weight of a polyphosphonate prepared from dihydroxybiphenyl and diphenyl methanephosphonate ($\eta_{rel}=1.100$, measured on a 0.5% strength solution in methylene chloride at 25° C.) are incorporated, on a single-screw extruder (Haake) at a melt temperature of 278° C., into 90 parts by weight of a polyamide formed from isophthalic acid and hexamethylenediamine, having a relative viscosity of 2.5, measured on a 1% strength solution in m-cresol at 25° C. The granules are processed to give transparent shaped articles. The behaviour in fire as specified in UL, Subj. 94 is V 0 for a wall thickness of 1.6 mm.

Example 2

Example 1 is repeated, a mixture of 15 parts by weight of polyphosphonate and 75 parts by weight of polyamide being prepared. The melt temperature is 276° C. The shaped articles obtained from this mixture are transparent and have a behaviour in fire as specified in UL Subj. 94 of V 0 for a wall thickness of 1.6 mm.

Example 3

88 parts by weight of polyamide formed from isophthalic acid and hexamethylenediamine ($\eta_{rel}=2.5$) and 12 parts by weight of polyphosphonate prepared from methanephosphonic acid and 4,4'-dihydroxybiphenyl ($\eta_{rel}=1.100$) are mixed at a melt temperature of 285° C. in a twin-screw extruder (Werner & Pfleiderer ZSK 32). A product having a relative viscosity of 2.4, capable of being processed to give transparent shaped articles, is obtained. The behaviour in fire as specified in UL, Subj. 94 is V 0 for a wall thickness of 1.6 mm.

The tracking resistance (VDE 0303, Part 1, DIN 53,480) has the following values: KB 600; KC 600.

Example 4

A mixture of 80 parts by weight of a polyamide of isophthalic acid and hexamethylenediamine ano 20 parts by weight of a polyphosphonate, prepared according to DOS (German Published Specification) No. 2,944,093 from diphenyl methanephosphonate and 4,4'-dihydroxybiphenyl, is compounded in a single-screw extruder (Haake) at a melt temperature of 274° C. The product can be processed to mouldings having an impact strength (DIN 53,453) of 42 kJ/m² and a heat distortion resistance of 130° C. (Vicat, VSTB).

The relative viscosities, measured at 25° C. in an Ubbelohde viscometer, are:
Polyphosphonate: 1.234 (0.5 percent strength solution in methylene chloride)
Polyamide: 2.5 (1 percent strength solution in m-cresol)
Blend: 2.4 (1 percent strength solution in m-cresol).

Example 5

A blend of 90 parts by weight of the polyamide of isophthalic acid and hexamethylenediamine from Example 4 and 10 parts by weight of a low molecular weight polyphosphonate, prepared from dihydroxydiphenyl and diphenyl methanephosphonate ($\eta_{rel}=1.100$, 0.5% strength in methylene chloride), are compounded on a twin-screw extruder (ZSK 32 from Werner & Pfleiderer) at a melt temperature of 262° C. A blend having a relative viscosity of 2.33 (1% strength in m-cresol) is obtained. The granules were processed to mouldings; the impact strength according to DIN 53,453 is as follows: not fractured in 8 cases, 103 kJ/m² in 2 cases.

Example 6

95 parts by weight of the polyamide of isophthalic acid and hexamethylenediamine from Example 4 and 5 parts by weight of a polyphosphonate prepared from hydroquinone and diphenyl methanephosphonate ($\eta_{rel}=1.16$, 0.5% strength in methylene chloride) are compounded on a twin-screw extruder (ZSK 32 from Werner & Pfleiderer) at a melt temperature of 247° C. A readily processable product having a relative viscosity of 2.9 (1% strength in m-cresol) is obtained.

Comparative example 1

As described in Example 4, a mixture of 90 parts by weight of polyphosphonate and 10 parts by weight of amorphous, partly aromatic polyamide is compounded at a melt temperature of 274° C. The blend has a relative viscosity of 1.4; the impact strength according to DIN 53,453 is 4 kJ/m$^2$ and the Vicat heat distortion resistance (VSTB) is 127° C. Although an excessively high proportion of polyphosphonate is capable of being compounded it leads to high polymer degradation.

Comparative example 2

An attempt is made to mix 20 parts by weight of polyphosphonate (according to Example 4) and 80 parts by weight of polyamide 66 ($\eta_{rel}$=3.0, 1% strength in m-cresol) in a single-screw extruder (Haake) at a melt temperature of 270° C. Since the mixture is crosslinked during this procedure, it is impossible to prepare usable, processable granules.

Comparative example 3

A mixture of 10 parts by weight of polyphosphonate (according to Example 4) and 90 parts by weight of polyamide 6 ($\eta_{rel}$=3.0, 1% strength in m-cresol) are introduced into a single-screw extruder (Haake). The material cannot be extruded at a temperature of about 270° C. since it is already crosslinked in the extruder.

We claim:

1. Flame-proof polyamide materials which can be processed by a thermoplastic method and comprise blends of
   1. 60-97% by weight of amorphous, partly aromatic polyamide and
   2. 3-40% by weight of polyphosphonate, the sum of the two components 1 and 2 always being 100% by weight, and wherein the polyphosphonates contain recurring units having the structure

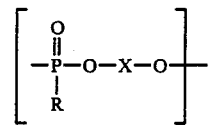

wherein

R represents an alkyl having 1-6 carbon atoms, cycloalkyl having 5-30 carbon atoms, an alkyl having 7-30 carbon atoms, or an aryl having 6-30 carbon atoms, X denotes at least one of phenylene or a radical of the formula

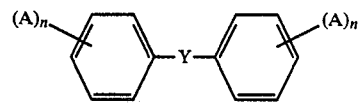

wherein n is an integer from 0 to 4,

Y is a single bond or a C$_1$-C$_5$-alkylene, a C$_5$-C$_{12}$-cycloalkylene or an S, O, SO$_2$, CO or C(CH$_3$)$_2$ bridge member, and the aromatic rings are unsubstituted or substituted with C$_1$-C$_4$-alkyl groups (A) having up to 4 alkyl groups in each ring.

2. Polyamide materials according to claim 1, characterized in that they consist of blends of
   1. 97-80% by weight of amorphous, partly aromatic polyamide and
   2. 3-20% by weight of polyphosphonate.

3. Polyamide materials according to claim 1, characterized in that they consist of blends of
   1. 92-85% by weight of amorphous, partly aromatic polyamide and
   2. 8-15% by weight of polyphosphonate.

4. Polyamide moulding materials according to claim 1, characterized in that the polyphosphonates have averate molecular weights (number average Mn, determined by osmometry in methylene chloride) of 2,000 to 80,000.

5. Polyamide moulding materials according to claim 1, characterized in that the polyphosphonates are phosphonic acid esters of 4,4'-dihydroxybiphenyl or of hydroquinone with methanephosphonic acid or ethanephosphonic acid.

6. Polyamide moulding materials according to claim 1 wherein the polyphosphonates are mixed esters of 4,4'-dihydroxybisphenyl and hydroquinone with methanephosphonic acid or ethane phosphonic acid.

* * * * *